United States Patent [19]

O'Neill et al.

[11] Patent Number: 5,993,059
[45] Date of Patent: Nov. 30, 1999

[54] COMBINED EMISSIVITY AND RADIANCE MEASUREMENT FOR DETERMINATION OF TEMPERATURE OF RADIANT OBJECT

[75] Inventors: James Anthony O'Neill, New City; Jyothi Singh, Hopewell Junction, both of N.Y.

[73] Assignee: International Business Machines Corporation, Armonk, N.Y.

[21] Appl. No.: 09/040,045

[22] Filed: Mar. 17, 1998

Related U.S. Application Data

[62] Division of application No. 08/363,143, Dec. 23, 1994, Pat. No. 5,738,440.

[51] Int. Cl.[6] .................... G01J 5/08; G01J 5/62; G01N 25/00
[52] U.S. Cl. .................... 374/126; 374/9; 374/128
[58] Field of Search .................... 374/9, 126, 128, 374/127, 130; 250/341.5, 341.6, 341.8

[56] References Cited

U.S. PATENT DOCUMENTS

| | | | |
|---|---|---|---|
| 4,417,822 | 11/1983 | Stein et al. | 374/129 |
| 4,919,542 | 4/1990 | Nulman et al. | 374/9 |
| 5,011,295 | 4/1991 | Krishnan et al. | 374/9 |
| 5,156,461 | 10/1992 | Moslehi et al. | 374/121 |
| 5,165,796 | 11/1992 | Gat et al. | 374/126 |
| 5,226,732 | 7/1993 | Nakos et al. | 374/133 |
| 5,239,488 | 8/1993 | Markham et al. | 374/9 |
| 5,255,286 | 10/1993 | Moslehi et al. | 374/121 |
| 5,443,315 | 8/1995 | Lee et al. | 374/126 |
| 5,738,440 | 4/1998 | O'Neill et al. | 374/126 |

FOREIGN PATENT DOCUMENTS 0139037  8/1983  Japan ........................... 374/127

*Primary Examiner*—Christopher W. Fulton
*Assistant Examiner*—Quyen Doan
*Attorney, Agent, or Firm*—Alison D. Mortinger; Jay H. Anderson

[57] ABSTRACT

A system and method of measurement of emissivity and radiance of a wafer in a rapid thermal processing chamber enables determination of wafer temperature and control of temperature of the wafer. Mirrors enclose the chamber and reflect radiation from lamps within the chamber to heat the workpiece of interest. One or more viewing ports are provided in one of the mirrors to allow for the egress of radiant energy emitted by the wafer. The wavelength of the exiting radiation is selected by an optical filter having a passband which passes radiation at wavelengths emitted by the wafer while excluding radiation emitted by heating lamps. A chopper having surface regions differing in their reflectivity and transmissivity is positioned along an optical path of radiation propagating through the one or more ports, this resulting in a pulsation of detected radiation. The ratio of the detected intensities of the radiation pulses is used to determine wafer reflectance based on reflectivity and transmissivity of the reflective portion of the chopper. The maximum intensity of radiation is also taken as a measure of radiance. The reflectance is employed to calculate the emissivity, and the emissivity in combination with the radiance are employed to calculate the wafer temperature.

14 Claims, 5 Drawing Sheets

COMBINED EMISSIVITY AND RADIANCE MEASUREMENT FOR DETERMINATION OF TEMPERATURE OF RADIANT OBJECT

This application is a divisional of application Ser. No. 08/363,143 filed on Dec. 23, 1994, now U.S. Pat. No. 5,738,440.

BACKGROUND OF THE INVENTION

This invention relates to temperature measurement of an object in a radiative environment, such as a semiconductor wafer in a rapid thermal processing (RTP) chamber, by computation of the temperature from noncontact in-situ measurement of emissivity and radiance of the object. As a particularly advantageous feature, the emissivity is determined in situ and in real-time by measuring wafer reflectance without an external light source through the use of a chopper having regions of different transmissivity and reflectance. The ratio of light intensities detected through the open and reflecting portions of the shutter is used to determine the emissivity of the wafer for pyrometric temperature measurement purposes. Furthermore, in situ, real-time radiance measurements are obtained through the open region of the shutter. Interference due to radiation from the heating lamps is excluded by appropriate wavelength selection and by the use of a light pipe that collects light from a defined direction. This technique enables single-point measurements of the temperature of a hot object in a radiative environment, and it can be used for precise control of temperature in this environment. Through the use of several sensors at separate locations across the wafer along with appropriate control of the lamp intensities in different zones of the reactor, it is possible to control the temperature profile (uniformity) across the wafer during the initial heating ramp as well as at steady state. Since the temperature measurement is attained in real time, it can be used advantageously to control both the heating of the chamber and the temperature of the heated object.

In manufacturing processes, the heating of a workpiece is employed often in one or more of the manufacturing steps in order to obtain a desired end product. This is particularly true in the case of manufacture of semiconductor circuits and other semiconductor products wherein a wafer is treated by various steps of etching, doping and cleaning to construct a complex configuration of circuit components on the wafer. During various stages of the manufacture, the temperature of the wafer must be elevated, for example, to temperatures in the range of 600–1200 degrees Centigrade. It is the practice to place the wafers in a furnace to obtain the desired temperature; however, more recently the use of RTP apparatus has come into use as a more attractive alternative to furnace processing of wafers because RTP provides for a rapid, single wafer processing with advantages of better control and lower manufacturing costs. However, especially in view of the short duration of many RTP steps, it becomes increasingly important to measure and to control the temperature closely. Control of temperature requires a measurement of the temperature, and it is advantageous to employ in-situ temperature measurement by a viewing of radiation of the wafer, or other workpiece, without physically contacting the wafer. Such a temperature measurement may be done at several discrete points on a wafer to obtain data of any nonuniformity in temperature, or temperature profile, across the wafer.

Accurate measurement of temperature is obtained from a combination of both emissivity data and radiance data of a workpiece or other object in a radiative environment wherein the data is obtained at a specific wavelength, and the temperature is calculated from this data. An improvement in the measurement of emissivity directly benefits the temperature measurement and allows for a more accurate determination of the temperature.

Typically, emissivity of an object has been determined from a measure of reflectance of the object. In the past, such measurement has employed directional reflectance using a filtered lamp radiation or a laser as a source of light at an appropriate wavelength. Such techniques are taught in the following U.S. patents: U.S. Pat. No. 4,647,774 (Quantum Logic Corp., Mar. 3, 1987), U.S. Pat. No. 4,956,538 (Texas Instruments, Inc., Set. 11, 1990), U.S. Pat. No. 5,156,461 (Texas Instruments, Inc., Oct. 20, 1992), and U.S. Pat. No. 4,919,542 (A.G. Processing Technology, Apr, 24, 1990). The light, typically infrared light, is directed as an incident beam at the object from a point external to the radiative environment of the object. Light from the incident beam is reflected from the object as a reflected beam. In a situation of major concern herein, the object is a semiconductor wafer, and the radiative environment is an RTP chamber enclosing the wafer. The intensities of the incident and the reflected beams in a given direction are used to derive the wafer reflectivity at the desired wavelength. The fraction of the reflected light collected in the chosen direction is also measured using scattering measurements described in U.S. Pat. No. 5,156, 461 (Texas Instruments, Inc.) The measured bidirectional reflectance in combination with the specularity measurements, yield information about the total reflectivity of the wafer. A disadvantage of this method is the need for additional hardware in the form of an external light source which increases the cost and size of the temperature sensing system.

Other apparatus employed in the measurement of emissivity includes the use of two fibers mounted in an RTP chamber in such a fashion that one of the fibers views the output of lamps used to heat the wafer, and a second of the fibers views radiation coming from the wafer, the latter including thermal wafer emissions as well as the lamp radiation reflected from the wafer. This technique is described in U.S. Pat. No. 5,154,512 (Luxtron Corp.). Typically, the measurements are made at 0.9–1.5 micron wavelength where the lamp intensity is high and the wafer is opaque. This method makes use of the fact that the intensity of the lamp emission, as well as the reflected lamp radiation, has an AC component due to imperfect electrical filtering in the supplying of current to the lamp, while the wafer thermal emission is continuous because of its long thermal time constant. The reflectance is then measured as the ratio of the AC components of the light from the two fibers. Emissivity is then calculated from Kirchoff's Law. In this method, since the light is collected from a fairly large region on the wafer, the signal of the reflected radiation is not extremely sensitive to surface roughness. A disadvantage of this method includes the need to modify the housing of the RTP apparatus to allow the sensors to be installed at appropriate locations.

There are several well-known and severe problems when emissivity is not measured during the RTP process due to a variation in the emissivity of the object. Such variation degrades the accuracy and repeatability of pyrometric temperature measurements by introducing errors as much as several tens of degrees Centigrade. In general, the wafer emissivity is not constant from wafer to wafer and for a given wafer during a manufacturing process because the emissivity is a function of a number of variables including wafer temperature, surface film thicknesses, films on the heating chamber wall which alter the chamber reflectivity, backside roughness of the wafer, and process history. Therefore, it is necessary to monitor the emissivity of wafers in situ and in real time, and in a non-contact manner to insure correct temperature measurement. The use of other forms of measurements wherein the object must be removed from its environment, or by use of monitor wafers to provide a substitutional form of measurement, or the use of theoretical calculations to estimate emissivity do not provide the desired amount of accuracy because of variations in the manufacturing process and in the wafer itself. It is known that, by use of Kirchoff's Law, emissivity can be determined solely from reflectance measurements for the case wherein the wafer is opaque, including the situation wherein the opacity is induced by temperature or by doping. For highly doped wafers, or for measurement of wavelength less than approximately one micron, emissivity measurement from reflectance alone is possible for objects at room temperature and above. However, for emissivity measurements conducted at longer wavelengths or for lower doping, such as at a wavelength of three microns for an undoped silicon wafer, and in the absence of films on the wafer, determination of emissivity from reflectance measurements alone can be accomplished only at temperatures higher than approximately 700 degrees Centigrade wherein the wafer is opaque.

A problem arises in that presently available apparatus and procedures are not readily implemented for standard forms of RTP apparatus without extensive modification and/or introduction of ancillary hardware to the RTP apparatus, this creating a need for measurement equipment and procedure which are easier to implement.

SUMMARY OF THE INVENTION

The aforementioned problem is overcome and other advantages are provided by a system and methodology of temperature measurement which, in accordance with the invention, employ measurement of reflectance of an object or workpiece within a radiative environment such as an RTP chamber, for determination of emissivity of the object from a reflectance measurement without the use of an external light source. The spectral region where the emissivity can be measured is between 1 and 5 um. In this wavelength range, light is emitted by both the hot wafer and the heating lamps. However, at wavelengths longer than 4.5 um, radiation emitted by the heating lamps is significantly attenuated by the quartz envelope which surrounds the lamps. Furthermore, there is a calculation of the temperature of the workpiece from emissivity and radiance data of the workpiece at a specific wavelength of the measurement.

The invention enables an accurate measurement of the object temperature to be attained, and this temperature measurement may be applied to a controller of the lamp power supply to adjust heating of the object for accurate maintenance of a desired temperature. It is noted that the foregoing system and methodology accomplishes the foregoing measurement without providing for any physical contact of the measuring instruments with the object, and, furthermore, allows the measurement to take place while the object remains in its place within the chamber. Furthermore, the measurement is obtained by a direct viewing of the object itself so as to obviate the need for use of monitor wafers to obtain an estimate of the measurement.

The invention is operative with various configurations of standard, commercially available RTP chambers, such as a chamber having a single centrally located viewing port and a chamber having a pair of viewing ports located near opposite ends of the chamber. Measurements of reflectance and radiance are conducted by use of the existing viewing ports without requiring modification of the RTP chamber. One preferred embodiment of the invention is operative with the single central viewing port, and a second embodiment of the invention is operative with the pair of spaced apart viewing ports. Each embodiment of the invention employs a detector of radiation, the radiation propagating via a viewing port from the object, and an optical shutter or chopper. The chopper has regions differing in transmissivity and reflectivity, and is employed for modulating the intensity of rays of radiation propagating between the object and the detector in order to determine the reflectivity of the object. Both the chopper and the detector are located outside of the RTP chamber. By way of example in describing the invention, the object is presumed to be a semiconductor wafer.

With respect to the first embodiment of the invention, the RTP apparatus has a plurality of heating lamps or elements for heating a wafer within the chamber, and includes opposed mirrors for reflecting lamp radiation or light upon the wafer. The single viewing port is provided in a central region of a first one of the mirrors. Typically the foregoing wafer surface is flat. The central location of the port permits the detector to view the wafer along a line of sight which is perpendicular to the surface of the wafer. A chopper, positioned between the port and the detector, has a transparent or open region, and a reflective region which is partially transmissive.

Upon rotation of the chopper disk, the transparent and reflective portions pass in alternating fashion in front of the port to modulate the intensity of the light incident upon the detector. The modulation produces an alternating succession of strong and weak pulses of light. If desired, a sapphire rod or other light guide may be passed through the port to control the direction of the light collection. The sapphire rod collects light from a solid angle determined by its numerical aperture and refractive index. It is compatible with elevated temperature operation, and it is transparent in the wavelength region of interest. Appropriate positioning of the quartz rod enables light collection from the wafer and not from other regions of the quartz chamber. The accuracy of this temperature measurement technique can be further enhanced by the selection of the appropriate spectral wavelength to avoid interference from radiation emitted from the heating lamps. The ratio of intensity of the weak pulses to the intensity of the strong pulses is dependent, by a mathematical relationship, on the reflectance of the wafer as well as on the reflectance and transmittance of any reflecting surfaces in the optical path outside of the chamber, such as the transmittance and reflectance of the regions of the chopper. The latter two parameters are known, and the intensity ratio is measured to permit a solving of the mathematical relationship for the wafer reflectance.

In the second embodiment of the invention, the lamps and a reflector are located on one side of the chamber for illuminating a top side of the wafer, and the two viewing ports are located in a housing of the RTP apparatus facing the bottom side of the wafer. The spaced-apart locations of the two viewing ports permit a viewing of the wafer, via either one of the ports, by the detector along a line of sight which is angled relative to the bottom wafer surface. The line of sight intercepts the bottom wafer surface at a viewing site. The detector views the wafer via a fixed partially transmissive reflector. The chopper has a transparent or open region and a fully reflective region. The chopper is positioned along a second line of sight passing through the second viewing port to the viewing site on the wafer. The two lines of sight are angled equally to the wafer surface and provide a single optical path wherein light propagating from the reflective region of the chopper toward the wafer is reflected at the wafer viewing site to the detector. Operation of the chopper provides for modulation of the intensity of light propagating along the optical path to the detector. In a manner similar to the foregoing operation of the first embodiment, in the operation of the second embodiment, there is a mathematical relationship between the intensity ratio of the light pulses and of the reflectance and transmittance of optical elements of the optical path, including the reflectance of the wafer, which can be solved for the wafer reflectance.

A third embodiment of the invention is similar to the second embodiment and provides for emplacement of the chopper in front of the detector in place of the partially transmissive reflector. A fixed fully reflective mirror is located on the second line of sight in place of the chopper. In the operation of the third embodiment, there is also a mathematical relationship between the intensity ratio of the light pulses and of the reflectance and transmittance of optical elements of the optical path, including the reflectance of the wafer, which can be solved for the wafer reflectance.

In the three embodiments of the invention, the light pulses obtained by the open region of the chopper, and sensed by the detector, may be taken as a measure of the radiance of the wafer. The emissivity is calculated from the reflectance, and the temperature is calculated from the emissivity and the radiance at a specific value of wavelength of the light. The temperature may be employed by a controller of a power supply which energizes the lamps, thereby to provide a feedback loop for maintaining a desired temperature of the wafer in the radiative environment.

It is noted that the invention is particularly suited for measurement of temperature of a wafer having a flat surface for directing rays of radiation to a detector for the radiance and reflectance measurements. However, in the general situation, the invention may be employed for measuring temperature of some other object having a different shape, and possibly within some other radiative environment such a heating chamber operative with a concave mirror for reflective feedback of light upon the object.

BRIEF DESCRIPTION OF THE DRAWING

The aforementioned aspects and other features of the invention are explained in the following description, taken in connection with the accompanying drawing figures wherein.

Identically labeled elements appearing in different ones of the figures refer to the same element in the different figures.

DETAILED DESCRIPTION

Figure 1:
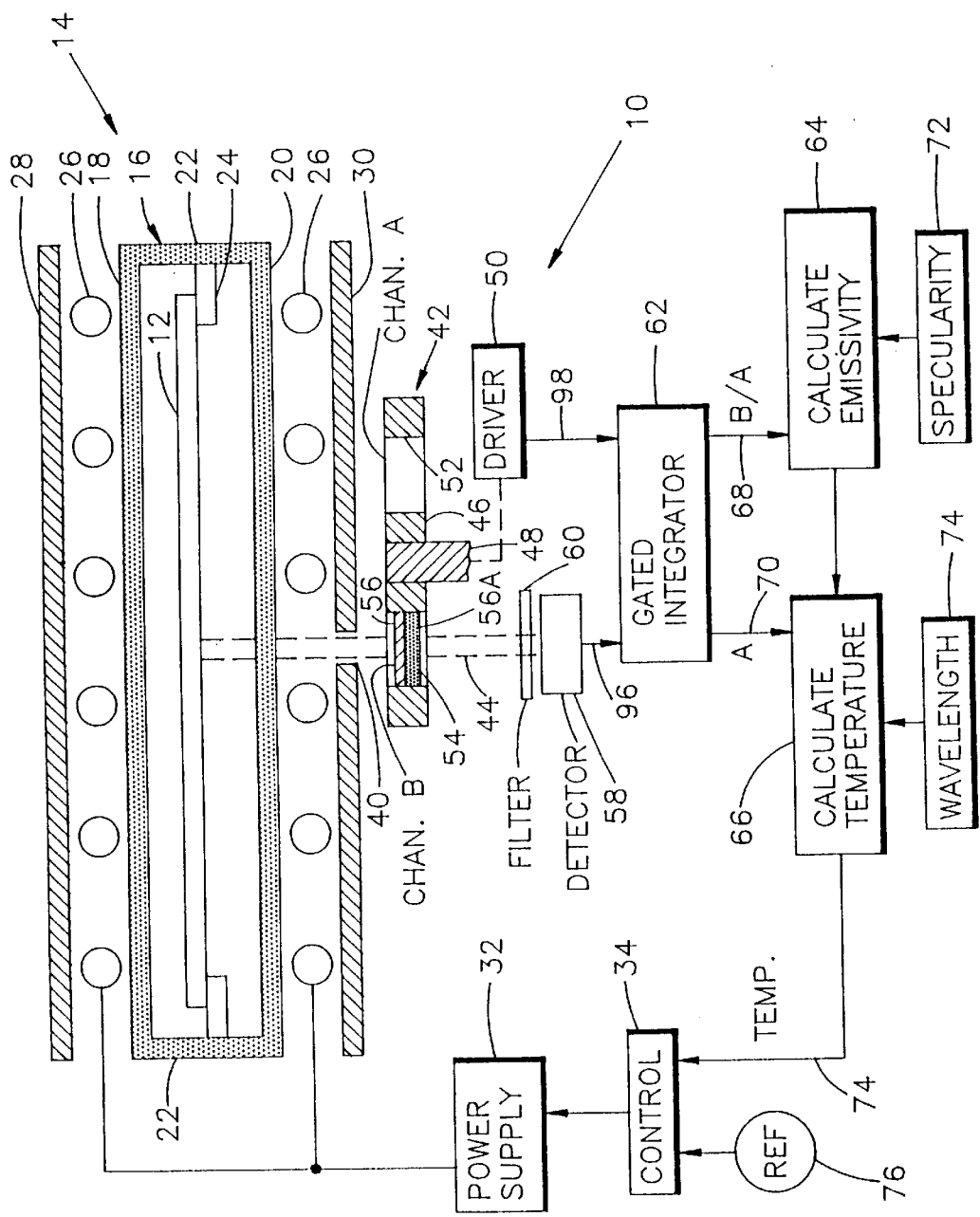
FIG. 1 is a diagrammatic view of an RTP apparatus and an optoelectronic system for analyzing radiation emitted via a port to measure emissivity and radiance of a workpiece within the chamber, the system providing for a determination of temperature of the workpiece from emissivity and radiance data.

FIG. 1 shows a system 10 for measurement of emissivity of a semiconductor wafer 12 in the radiative environment of a heating apparatus 14, such as RTP apparatus, and for controlling the apparatus 14 to maintain a desired temperature of the wafer 12. It is to be understood that the use of the RTP apparatus in the preferred embodiment of the invention is provided by way of example in the practice of the invention, and that the theory of the invention applies to other forms of heating apparatus and to objects or workpieces other than the semiconductor wafer 12. The heating apparatus 14 includes a chamber 16 which encloses the wafer 12, and comprises a top wall 18, a bottom wall 20, and sidewalls 22. The wafer 12 has a flat planar form, as do the top and bottom walls 18 and 20, and is held between the top and the bottom walls 18 and 20 by supports 24 extending inwardly from the sidewalls 22.

Rows of heating lamps 26, external to the chamber 16 illuminate the wafer with radiant energy to heat the wafer 12. The lamp 26 may be any well known form of heating lamp or section of a heating filament. The walls of the chamber 16 are fabricated of a material, such as quartz, which is transparent to the radiation of the lamps 26. An upper row of the lamps 26 is provided above the top wall 18, and a lower row of the lamps 26 is positioned below the bottom wall 20. The heating apparatus 14 further comprises a top mirror 28 located above the upper row of the lamps 26 and a bottom mirror 30 located below the bottom row of the lamps 26 for reflecting rays of the lamp radiation onto the wafer 12. Electric current for energizing the lamps 26 is provided by a power supply 32 operative in response to an electric signal from a controller 34 for maintaining a desired temperature of the wafer 12. The reflecting surfaces of the mirrors 28 and 30 are planar and parallel to each other and to the wafer 12. The heating apparatus 14 is provided with a port 40 for viewing the wafer 12, the port 40 being formed as an aperture within the bottom mirror 30 and being located approximately equidistant between two neighboring lamps 26.

In accordance with the invention, the system 10 includes an optical shutter, or chopper 42 located within an optical path 44 of radiation propagating through the port 40 in a direction normal to the bottom surface of the wafer 12. The chopper 42 comprises a disk 46 disposed on a shaft 48 connected to a driver 50 which imparts rotation to the chopper 42. The disk 46 has an opening 52 which serves as a fully transmissive region of the chopper 42. The disk 46 supports a partially transmissive mirror 54. The film 56 on the substrate 56A constitutes a reflecting surface and is disposed in a plane perpendicular to the optical path 44.

The system 10 also includes a detector 58 of the radiation propagating along the path 44, there being a filter 60 located on the optical path 44 and positioned directly in front of the detector 58. The filter 60 has a passband centered at the frequency at which the emissivity and the radiance are to be measured. In one embodiment, the passband lies outside the spectral transmission band of the thick quartz of the body of the chamber 16, at wavelengths greater than approximately 4.5 micron, to exclude radiation of the lamps 26 from the detector 58 during measurement of the wafer radiance. Interference due to radiation from the heating lamps is further reduced by the use of a light guide such as the sapphire rod discussed above. Upon rotation of the chopper 42, the intensity of light reaching the detector 58 via the path 44 is modulated such that, upon passage of the light via the opening 52, full intensity of the light is received at the detector 58. Upon interposition of the partially reflecting mirror 54 in the optical path 44, part of the radiant energy is reflected by the mirror 54 back into the chamber 16, and part of the radiant energy propagates through the mirror 54 and the filter 60 to the detector 58. With respect to such part of the radiant energy which is reflected by the mirror 54, it is noted that there are multiple reflections of radiation between the lower reflecting surface of the wafer 12 and the mirror 54. In a manner to be described hereinafter, the reflectivity of the wafer is derived from the ratio of the light intensities propagating through the two regions of the chopper. From the reflectivity, the emissivity of the wafer is determined. It is convenient to identify the opening 52 of the chopper 42 as channel A, and the mirror 54 as channel B. The intensity of radiation received at the detector 58 and propagating via channel B is typically less than the intensity of radiation propagating via channel A.

The system 10 further comprises a signal processor 62 such as a gated integrator or a waveform averager, an emissivity calculation unit 64, and a temperature calculation unit 66. In operation, the detector 58 outputs an electric signal to the signal processor 62 representing the intensity of radiation detected by the detector 58. The signal processor 62 is operative, in a manner to be described hereinafter, to output two signals, one of which is the ratio of intensities of the signal of channel B to the signal of channel A, and the other output signal which is the intensity of the signal of channel A. The ratio of the intensities of the signals of channel B and channel A are outputted via line 68 to the emissivity calculation unit 64. The intensity of the signal at channel A is outputted via line 70 to the temperature calculation unit 66.

The intensity ratio on line 68 is employed by the emissivity calculation unit 64, in a manner to be described hereinafter, to calculate the reflectance of the wafer 12, the reflectance then being used to give the emissivity of the wafer 12. The measured bidirectional reflectance combined with the known specularity of the wafer yields the total reflectance of the wafer for the purposes of determining its emissivity. The specularity would be measured prior to operation of the system 10 and stored at 72 for use by the emissivity calculation unit 64. The intensity of the signal of channel A, at line 70, serves as a measure of the radiance of the wafer 12.

The temperature calculation unit 66 employs the radiance of line 70 and the emissivity outputted by the unit 64 to calculate the temperature of the wafer 12. A signal representing the temperature measurement is outputted via line 74 from the temperature calculation unit 66 to the controller 34. The value of radiation wavelength to be employed in the calculation of the temperature by the unit 66 is stored at 74 and inputted to the unit 66 for calculation of the temperature. Details in the operation of the emissivity calculation unit 64 and the temperature calculation unit 66 will be provided hereinafter. The controller 34 is responsive to the temperature signal on line 74, and to a reference temperature input 76 for outputting a control signal to the power supply 32. The control signal to the power supply 32 commands the requisite amount of current to the lamps 26 for maintaining the wafer temperature substantially equal to the reference temperature.

Figure 2:
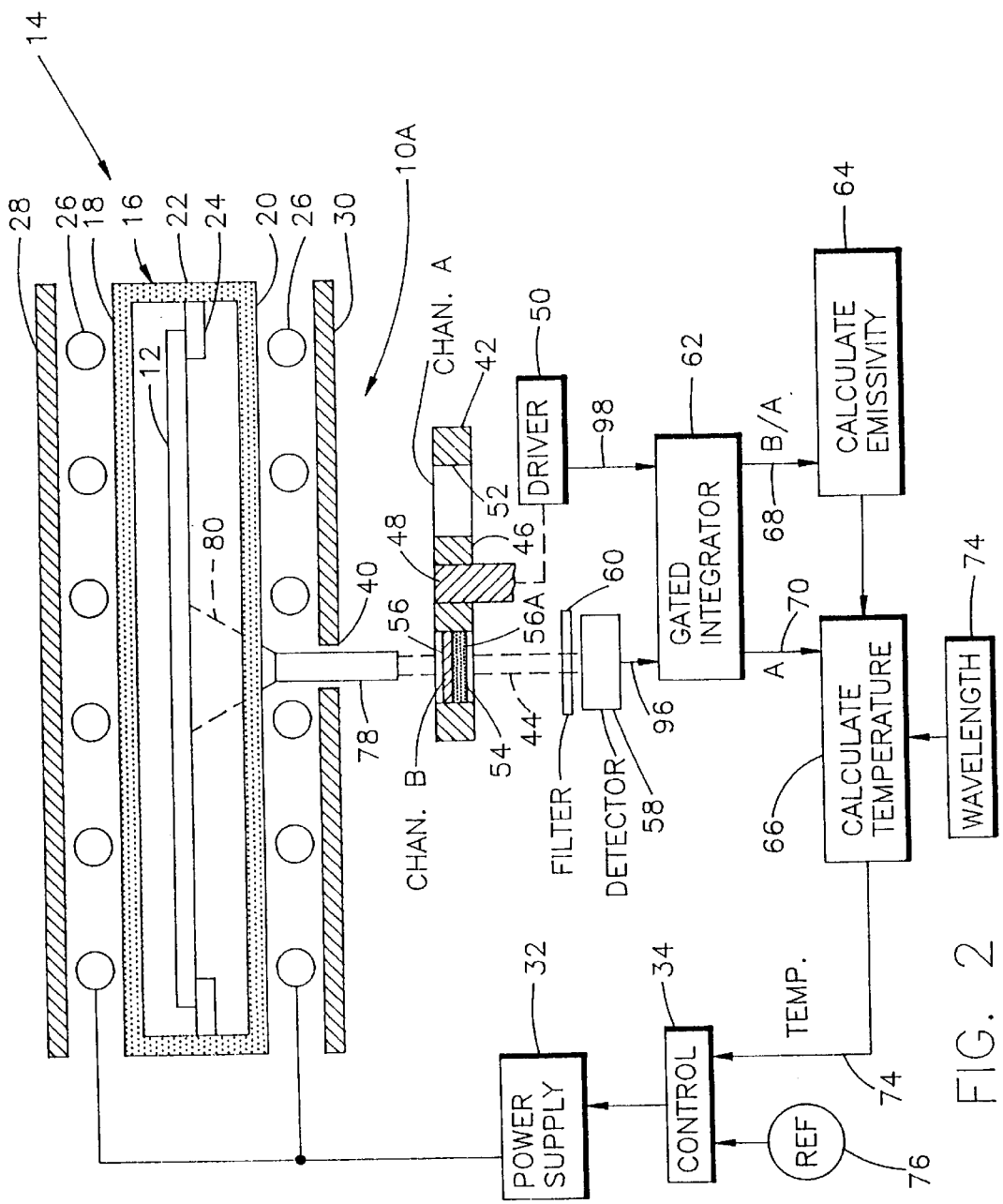
FIG. 2 is a modification of view of FIG. 1 showing a sapphire rod used as a light conduit in the port.

FIG. 2 shows a system 10A which is an alternative embodiment of the system 10 of FIG. 1. The system 10A has essentially the same components as the system 10, but further comprises a rod 78 inserted within the port 40 and oriented along the optical path 44. The rod 78 extends into the heating apparatus 14 to a point beyond the lower row of lamps 26, and extends outwardly from the heating apparatus 14 to a location immediately in front of the chopper 42. The rod 78 is made of a material which is transparent to the radiation emitted by the wafer 12. In a preferred embodiment of the invention, the rod 78 is made of sapphire. Appropriate positioning of the sapphire rod minimizes the collection of light from the heating lamps and maximizes the optical signal due to emission from the wafer. Interference due to lamp radiation is further reduced by detecting emission in an optical region outside the range where light is transmitted through the thick quartz walls of the chamber but within the transmission region of a thinned region of the quartz provided to view the wafer.

An additional aspect in the operation of the systems of both FIGS. 1 and 2 is the fact that the partially reflecting mirror 54 of the chopper 42, in cooperation with reflectance of the wafer 12, provides for a succession of reflections of radiant energy along the path 44. In a manner to be described hereinafter, the reflectivity of the wafer is determined from the ratio of the light intensities propagating through the two regions of the chopper. From its reflectivity, the emissivity of the wafer is determined directly.

Figure 3:
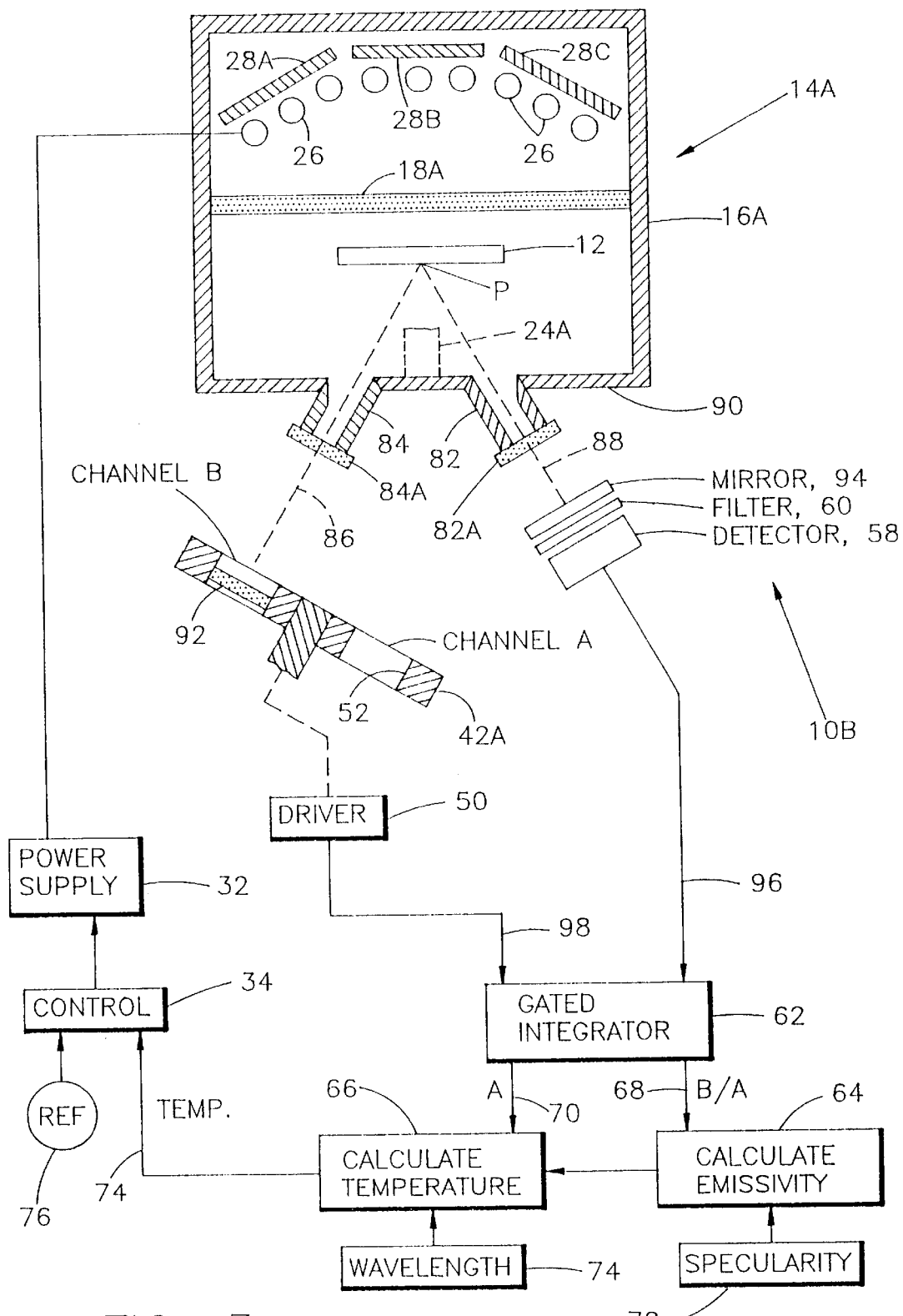
FIG. 3 is a diagrammatic view of an alternative embodiment of the optoelectronic system of FIG. 1 for use with an RTP apparatus of different configuration from the RTP apparatus of FIG. 1, wherein the system is operative with two spaced-apart ports in a housing of the RTP apparatus for viewing the workpiece.

FIG. 3 shows a system 10B which is a further embodiment of the invention, the system 10B employing essentially the same components as the system 10 of FIG. 1, but employing a heating apparatus 14A having a configuration which differs from the configuration of the heating apparatus 14 of FIGS. 1 and 2. In FIG. 3, the heating apparatus 14A comprises a housing 16A fabricated of metal walls which enhance reflection of radiant energy within the housing. The housing 14A is divided by a transparent wall in the form of a quartz plate 18A into an upper section and a lower section. The wafer 12 is located in the lower section, and a plurality of the heating lamps 26 is located in the upper section. Radiation from the lamps 26 propagates through the quartz plate 18A to heat the wafer 12. Three mirrors 28A, 28B, and 28C are positioned behind the lamps 26 for reflecting light of the lamps 26 toward the wafer 12. Two viewing ports 82 and 84 which are spaced apart from each other are provided for viewing the wafer 12 at a point P from two different directions along optical paths 86 and 88. The ports 82 and 84 are angled relative to the bottom surface of the wafer 12, the latter being parallel to the plate 18A, and are located in a bottom wall 90 of the housing 16A. The ports 82 and 84 have a tubular shape and are closed off by quartz windows 82A and 82B. Also provided in the housing 16A, and partially shown in phantom view, is a central support 24A upstanding from the bottom wall 90 for holding the wafer 12. The support 24A may be made of quartz, as is well known, and has a configuration permitting the viewing of the wafer 12 along the paths 86 and 88.

The system 10B further comprises a chopper 42A disposed on the optical path 86 and intercepting the optical path 86. The chopper 42A has a transparent region in the form of the opening 52 as does the chopper 42 of FIGS. 1 and 2, but differs from the chopper 42 of FIGS. 1 and 2 in that, in FIG. 3, the chopper 42A has a fully reflective mirror 92 which is normal to the optical path 86. Also included in the system 10B is a partially reflecting mirror 94 which is positioned on the optical path 88 with an orientation which is normal to the path 88. The mirror 94 is positioned in front of the filter 60 which, in turn, is positioned in front of the detector 58. The mirror 94 allows for a portion of radiation propagating along the path 88 to be transmitted via the filter 60 to the detector 58, and for a portion of the radiation propagating along the path 88 to be reflected back to the point P.

In operation, upon rotation of the chopper 42A by the driver 50, the opening 52 and the mirror 92 are brought alternately into a position of intercepting the path 86. Upon emplacement of the opening 52 in the optical path 86, all of the radiation propagating along the path 86 passes through the opening 52 and is lost. Upon emplacement of the mirror 92 within the optical path 86, all of the radiation is reflected by the mirror 92 back along the path 86 to the point P. The lower surface of the wafer 12 reflects light incident along the path 86 to propagate out of the housing 16A along the path 88 and, similarly, light incident upon the point P via the path 88 is reflected by the wafer 12 out of the housing 16A along the path 86.

The foregoing discussion of the increased radiation intensity along the path 44 in the systems of FIGS. 1 and 2 by multiple reflections between the chopper mirror 54 and the wafer 12 applies also, in analogous fashion, to the system of FIG. 3 wherein, upon the presence of the chopper mirror 92 in the optical path 86, there is a succession of reflections of radiant energy back and forth between the chopper mirror 92 and the mirror 94. As a result, the intensity of the radiation incident on the path 88 towards the detector 58 is higher during the presence of the chopper mirror 92 in the optical path 86 than during the presence of the chopper opening 52 in the optical path 86.

In FIG. 3, during rotation of the chopper 42A, the intensity of the radiation on the path 88 varies in repetitive fashion between higher and lower values of intensity. These values of intensity are outputted by the detector 58 along line 96 to the signal processor 62 in the manner of a train of electrical pulses varying in amplitude periodically in synchronism with the rotation of the chopper 42A. The filter 60 operates in the same fashion for filtering the radiation incident upon the detector 58 as has been disclosed previously for FIG. 1. Thus, the signal outputted by the detector 58 on line 96 in FIG. 3 is, apart from a scale factor, the same as that outputted by the detector 58 on line 96 in FIG. 1. Also, in each of the embodiments of the system 10, 10A and 10B of FIGS. 1–3, the driver 50 outputs a trigger signal on line 98 which triggers the signal processor 62 to operate in synchronism with the rotations of the chopper. By analogy with the operation of the system 10 of FIG. 1, in the system 10B of FIG. 3, channel A designates the signal for the open portion of the chopper and channel B designates the signal for the mirrored portion of the chopper.

Figure 4:
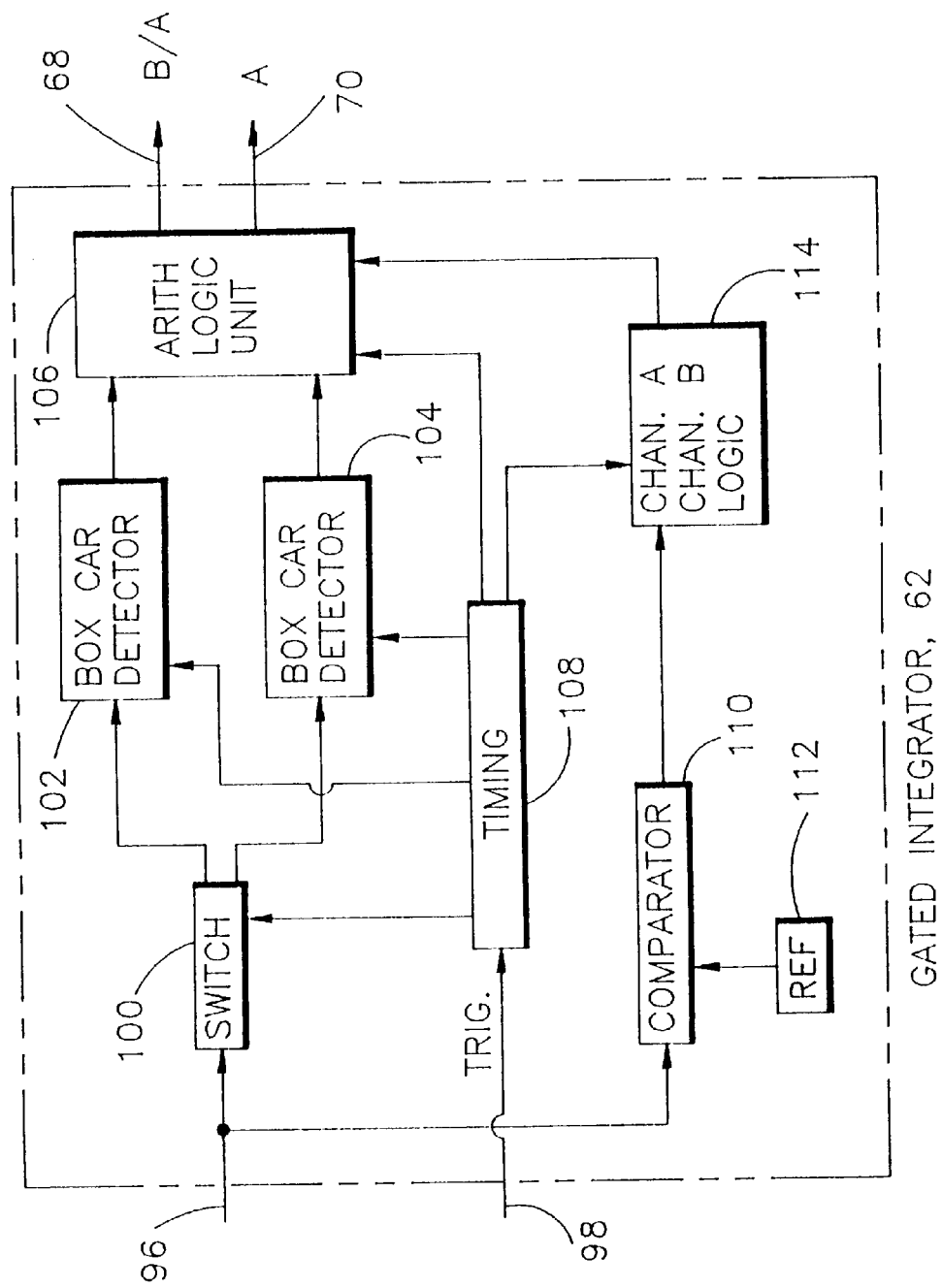
FIG. 4 is a block diagram of a gated integrator of FIGS. 1 and 2.

In one embodiment of the invention, the signal processor 62 shown in FIG. 4 is commercially available gated integrator and, accordingly, only a brief description of its circuit is provided herein. The integrator 62 comprises a switch 100, two box-car detectors 102 and 104, an arithmetic logic unit 106, a timing unit 108, a comparator 110, a reference signal source 112 providing a reference signal to an input terminal of the comparator 110, and a logic unit 114 determining whether an input signal on line 96 is from channel A or channel B. In operation, the trigger signal on line 98 synchronizes the timing unit 108 with rotation of the chopper 42, 42A, so as to provide timing signals for driving the switch 100 and the box-car detectors 102 and 104. The timing unit 108 also provides timing signals for operation of the arithmetic logic unit 106 and the logic unit 114. The switch 100 transmits an input signal on line 96 to the box-car detector 102 during one of the channel positions of the chopper, and to the box-car detector 104 during the other of the channel positions of the chopper. Each of the detectors 102 and 104 is operative to integrate and to store the signal on line 96 for the duration of each channel position of the chopper. The signal on line 96 is applied also to the comparator 110 which determines whether the signal is greater than or less than the reference signal provided by the source 112. The output of the comparator 112 is applied to the logic unit 114 which determines that channel A is present for a high output signal of the comparator 110 and that channel B is present for a low output signal of the comparator 110. The channel identification outputted by the logic unit 114 is applied to the arithmetic logic unit to enable it to perform arithmetic operations on the signals outputted by the detectors 102 and 104. The arithmetic logic unit 106 then outputs the ratio of the channel B signal to the channel A signal on line 68 and outputs the channel A signal on line 70.

Figure 5:
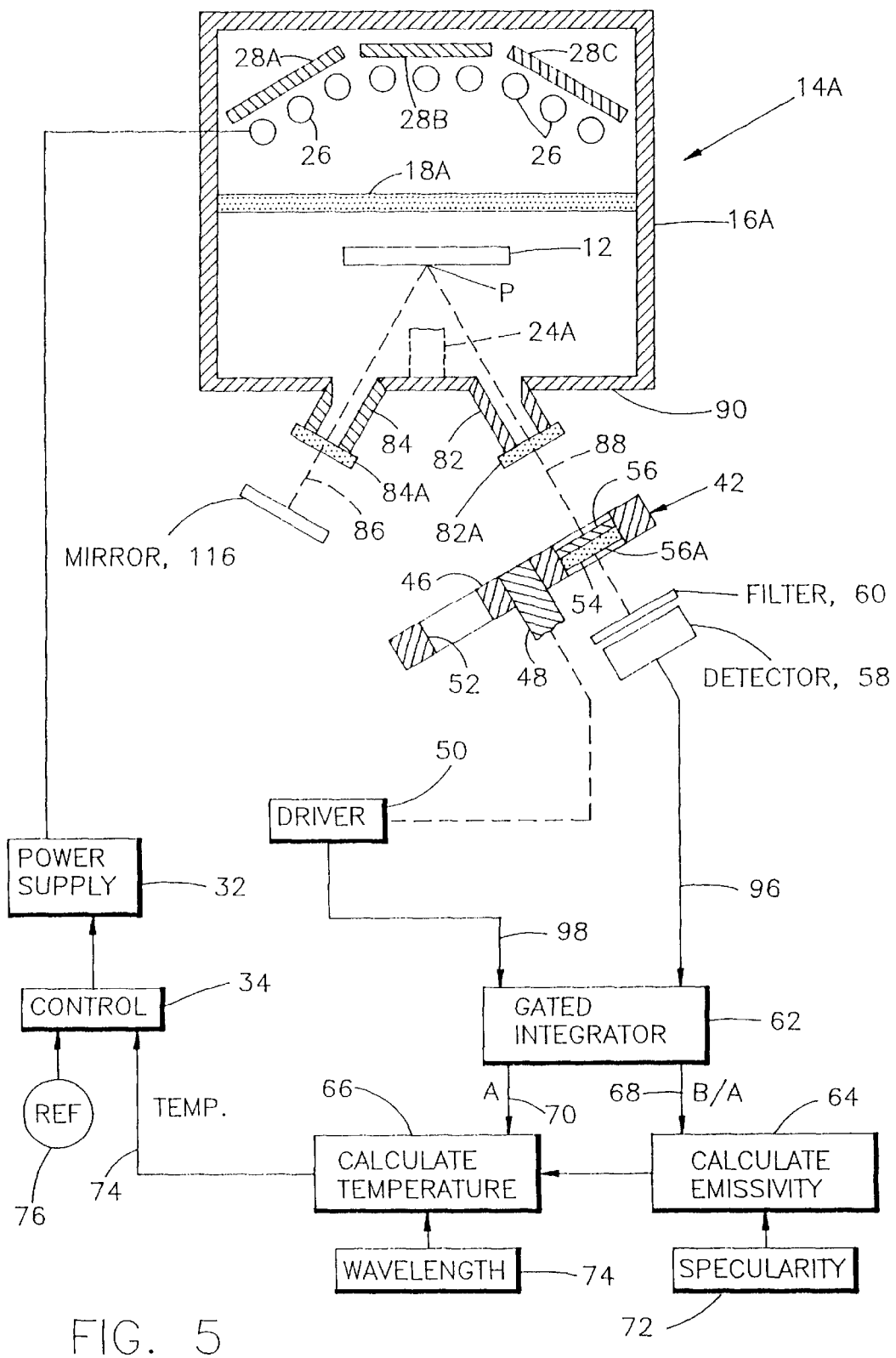
FIG. 5 is a diagrammatic view of a third embodiment of the invention similar to that of FIG. 2.

In FIG. 5, there is shown a system 10C which is substantially the same as the system 10B of FIG. 3 except that, in FIG. 5, the location of the chopper has been changed. The chopper 42 is employed on the optical path 88, in place of the mirror 94, and a fixed fully reflective mirror 116 is disposed on the optical path 86. Radiation is reflected back and forth along the paths 86 and 88 between the fixed mirror 116 and the chopper mirror 54 via the surface of the wafer 12. Alternate interposing of the chopper mirror 54 and the chopper opening 52 in the path 88 modulates the amplitude of the radiation intensity detected by the detector 58 to provide for a detector output signal on line 96 having essentially the same pulsed waveform as the signals on line 96 in the embodiments of FIGS. 1–3.

The emissivity calculation unit 64 is operative to calculate the reflectance of the wafer 12, for the embodiments of the invention depicted in FIGS. 1 and 2 by the following mathematical description:

$R_W$=wafer reflectance
$R_R$=reflectance of enclosure
$R_M$=reflectance of external mirror
$T_M$=transmittance of external mirror
$I_L$=radiance of extended lamp source at $\lambda_o \pm \alpha\lambda$
$I_W$=radiance of wafer at $\lambda_o \pm \Delta\lambda$
No mirror in path (channel A):

Signal (channel A)=$I_w + I_L R_w + I_L R_R R_w + I_L$

Mirror in path (channel B):

Signal (channel $B$)

$= I_L + I_W + I_L R_R R_W T_M + R_M R_W T_M + R_M^2 R_w^2 T_M + \ldots$ $= [I_L + I_W + I_L R_W + I_L R_R R_W][T_M][1 + R_m R_w = R_M^2 R_w^2 + \ldots]$ $= [I_L + I_W + I_L R_W + I_L R_R R_W][T_M]\left[\frac{1}{1 - R_M R_W}\right]$ $\frac{\text{Channel } B}{\text{Channel } A} = \frac{T_M}{1 - R_M R_W}$ The mathematical description is given in terms of the wafer reflectance $R_w$, the reflectance of the enclosure represented by the bottom mirror 30 and given by $R_R$, the reflectance of the external mirror provided by the reflecting surface 56 and given by $R_M$, the transmittance of the external mirror given by $T_M$, the radiance of the source of light represented by the lamps 26 and given by $I_L$, and the radiance of the wafer 12 given by $I_W$.

The detected signal for channel A (on line 96) is given by $$I_W + I_L R_W + I_L R_R R_W + I_L$$

The detected signal for channel B (on line 96) is given by $$[I_L + I_W + I_L R_W + I_L R_R R_W][T_M + R_M R_W T_M + R_M^2 R_W^2 T_M + \ldots]$$

which is equal to $$I_L + I_W + I_L R_W + I_L R_R R_W][T_M][1 + R_M R_W + R_M^2 R_W^2 + \ldots]$$

which is equal to $$[I_L + I_W + I_L R_W + I_L R_R R_W]\left[\frac{T_M}{1 - R_M R_W}\right]$$

The ratio of the two channel signals is given by $$\frac{\text{Channel } B \text{ Signal}}{\text{Channel } A \text{ Signal}} = \frac{T_M}{1 - R_M R_W}$$

With respect to the foregoing equation; the ratio of the channel signals (B/A) is outputted on line 68 from the gated integrator 62 and, hence, is known. The quantities $R_M$ and $T_M$ are also known. Therefore, the foregoing equation can be solved for the directional reflectance of the wafer.

The einissivity calculation unit 64 is operative to calculate the reflectance of the wafer 12, for the embodiments of the invention depicted in FIG. 3 by the following mathematical description:

$R_{M1}$=reflectance of mirror M1 on chopper
$R_W$=wafer reflectance
$T_{M2}$=transmittance of mirror M2
$R_{M2}$=reflectance of output coupling mirror
$I_L$=radiance due to lamp light in chamber
$I_W$=radiance from wafer Signal (channel A) with mirror M1 not in path=$I_W + I_L + I_L R_W$ Signal (channel B) with mirror M1 in path
$= (I_W + I_L + I_L R_W)(T_{M2})(1 + R_{M2} R_W R_{M1} R_W + R_{m2}^2 R_M^2 R_{M1}^2 R_w^2 + \ldots) + (I_W + I_L + I_L R_W)(T_{M2})(R_{M1} R_W)$
$(1 + R_{M2} R_W R_{M1} R_W + R_{m2}^2 R_M^2 R_{M1}^2 R_w^2 + \ldots)$
$= \frac{(I_W + I_L + I_L R_W)(T_{M2})}{(1 - R_{M2} R_W R_{M1} R_w)}(1 + R_{M1} R_W)$ which is solved for RW, the wafer reflectance.

A corresponding mathematical explanation of the operation of the embodiment of FIG. 5 may be derived in a manner similar to the foregoing mathematical explanations of the embodiments of FIGS. 1–3 and, accordingly, need not be presented herein.

The emissivity calculation unit 64 is operative to provide the emissivity for all of the embodiments of FIGS. 1–3 by solving the following equation;

$$\in = 1 - R$$

Where $\in$ is emissivity, and R is total reflectance of the wafer.

The temperature calculation unit 30 is operative to provide the temperature, for all of the embodiments of the invention of FIGS. 1–3, by solving Plank's equation.

$$R_\lambda = \frac{\in_\lambda (c_1)}{\lambda^5 (e^{c_2/\lambda T} - 1)}$$

where $R_\lambda$ is radiance
T is temperature
$\lambda$ is wavelength
$\in_\lambda$, is emissivity
$c_1$ and $c_2$ are constants Thereby the invention has accomplished a major objective of providing for an in-situ non-contacting method of measuring radiation emitted by a wafer or other object within a radiative environment by a procedure of modulating the emitted radiation without need for an external source of coherent radiation, such as the light of an infrared laser, to accomplish measurements of reflectance, emissivity, radiance and temperature.

It is to be understood that the above described embodiments of the invention are illustrative only, and that modifications thereof may occur to those skilled in the art. Accordingly, this invention is not to be regarded as limited to the embodiments disclosed herein, but is to be limited only as defined by the appended claims.

What is claimed is:

1. A system for measuring thermal characteristics of a radiant object, the thermal characteristics including radiance of the radiant object, comprising:
   a detector of radiant energy emitted by said object, said detector being positioned for receipt of radiant energy propagating along a first optical path angled relative to a surface of said object;
   a shutter assembly comprising a first region which is transparent to the radiant energy, and a second region which is reflective to said radiant energy, said shutter assembly being located on a second optical path angled relative to said surface of said object such that radiant energy incident along said second optical path to said object is reflected by said object along said first optical path, said shutter assembly being operative to interpose alternately said first region and said second region in said second optical path, there being a partially reflecting mirror in said first optical path and positioned adjacent said detector, said detector outputting a first signal upon interception of said second optical path by said second region and a second signal upon interception of said second optical path by said first region, said first signal being stronger than said second signal;
   means for dividing the second signal by the first signal to provide a reflectance of said object, the first signal serving as a measure of radiance of said object.

2. A system according to claim 1 further comprising means responsive to said reflectance and to said radiance to determine a temperature of said object.

3. A system according to claim 2 wherein said system is operative with a heating assembly including a heating chamber having a wall transparent to radiation at a designated wavelength, said object is a semiconductor wafer disposed within said heating assembly, said heating assembly comprises a row of heating elements outside said chamber and a mirror surface for reflecting radiant energy emitted by said heating elements to said wafer, said heating assembly having a first aperture disposed on said first optical path and a second aperture disposed on said second optical path for allowing propagation of radiant energy along said paths; and
   wherein a reflective surface of said second region of said shutter assembly is oriented relative to said second optical path for directing radiation toward said wafer to induce multiple reflections of radiant energy.

4. A system according to claim 3 wherein said shutter assembly is located outside of said heating assembly.

5. A method for measuring thermal characteristics of a radiant object, the thermal characteristics including radiance of the radiant object, comprising steps of:

positioning a detector for detecting radiant energy emitted by said object and propagating along a first portion of an optical path angled relative to a surface of said object;

placing alternately a first shutter region and a second shutter region in a second portion of said optical path angled relative to the surface of said object, said first region being transparent to the radiant energy, and said second region being reflective to the radiant energy;

outputting by means of said detector a first signal upon interception of said optical path by said second region, and a second signal upon interception of said optical path by said first region, and said first signal being stronger than said second signal; and dividing the second signal by the first signal to provide a reflectance of said object, the first signal serving as a measure of radiance of said object.

6. A method according to claim 5 further comprising a step of determining a temperature of said object based on said reflectance and said radiance.

7. A system for measuring thermal characteristics of a radiant object, the thermal characteristics including emissivity and radiance of the radiant object, comprising:

a detector of radiant energy emitted by said object, said detector being positioned for receipt of radiant energy propagating along a first optical path from a surface of said object;

a shutter assembly comprising a first region which is transparent to the radiant energy, and a second region which is at least partially reflective to the radiant energy, said shutter assembly being operative to interpose alternately said first region and said second region in a second optical path carrying radiant energy toward said surface of said object, said detector outputting a first signal upon interception of said second optical path by said first region and a second signal upon interception of said second optical path by said second region, said first signal and said second signal differing in intensity of the radiant energy, one of said signals serving as a measure of radiance of said object; and means for deriving the emissivity of said object by a mathematical combination of said first signal and said second signal.

8. A system according to claim 7 wherein said first optical path is angled to said second optical path.

9. A system according to claim 7 wherein said emissivity deriving means includes means for computing a reflectance of said object surface in terms of values of said first and said second signals and in terms of characteristic properties of said second region of said shutter assembly, there being an optical resonator cavity enclosing said object wherein said second region of said shutter assembly forms a part of said cavity.

10. A system for measuring thermal characteristics of a radiant object, the thermal characteristics including emissivity and radiance of the radiant object, comprising:

a detector of radiant energy emitted by said object, said detector being positioned for receipt of radiant energy propagating along an optical path from a surface of said object, said optical path being at an acute angle relative to a normal to the surface of said object;

a shutter assembly comprising a first region which is transparent to the radiant energy, and a second region which is at least partially reflective to the radiant energy, said shutter assembly being operative to interpose alternately said first region and said second region in said optical path, said detector outputting a first signal upon interception of said optical path by said first region and a second signal upon interception of said optical path by said second region, said first signal and said second signal differing in intensity of the radiant energy, one of said signals serving as a measure of radiance of said object; and means for deriving the emissivity of said object by a mathematical combination of said first signal and said second signal.

11. A method for measuring thermal characteristics of a radiant object, the thermal characteristics including emissivity and radiance of the radiant object, the method comprising steps of:

positioning a detector for detecting radiant energy emitted by said object and propagating along a first optical path from a surface of said object;

placing alternately a first shutter region and a second shutter region in a second optical path carrying radiant energy toward said surface of said object, said first region being transparent to the radiant energy, and said second region being at least partially reflective to the radiant energy;

outputting by means of said detector a first signal upon interception of said second optical path by said first region and a second signal upon interception of said second optical path by said second region, said first signal and said second signal differing in intensity of the radiant energy, one of said signals serving as a measure, of radiance of said object; and deriving the emissivity of said object by a mathematical combination of said first signal and said second signal.

12. A method according to claim 11 wherein said first optical path is angled to said second optical path.

13. A method according to claim 11 wherein said emissivity deriving step includes computing a reflectance of said object surface in terms of values of said first and said second signals and in terms of characteristic properties of said second region of said shutter assembly, there being an optical resonator cavity enclosing said object wherein said second region forms a part of said cavity.

14. A method for measuring thermal characteristics of a radiant object, the thermal characteristics including emissivity and radiance of the radiant object, the method comprising steps of:

positioning a detector for detecting radiant energy emitted by said object and propagating along an optical path from a surface of said object;

placing alternately a first shutter region and a second shutter region in said optical path, said first region being transparent to the radiant energy, and said second region being at least partially reflective to the radiant energy;

outputting by means of said detector a first signal upon interception of said optical path by said first region and a second signal upon interception of said optical path by said second region, said first signal and said second signal differing in intensity of the radiant energy, one of said signals serving as a measure of radiance of said object; and deriving the emissivity of said object by a mathematical combination of said first signal and said second signal.

* * * * *